US009297391B2

(12) United States Patent
Rued et al.

(10) Patent No.: US 9,297,391 B2
(45) Date of Patent: Mar. 29, 2016

(54) FLOW DEVICE COMPRISING A CAVITY COOLING SYSTEM

(75) Inventors: Peter Klaus Rued, Grobenzell (DE); David Koch, Munich (DE); Werner Humhauser, Moosburg (DE)

(73) Assignee: MTU AERO ENGINES GmbH, Munich (DE)

( * ) Notice: Subject to any disclaimer, the term of this patent is extended or adjusted under 35 U.S.C. 154(b) by 778 days.

(21) Appl. No.: 13/260,694

(22) PCT Filed: May 12, 2010

(86) PCT No.: PCT/DE2010/000532
§ 371 (c)(1),
(2), (4) Date: Sep. 27, 2011

(87) PCT Pub. No.: WO2010/130251
PCT Pub. Date: Nov. 18, 2010

(65) Prior Publication Data
US 2012/0045313 A1    Feb. 23, 2012

(30) Foreign Application Priority Data

May 14, 2009   (DE) .................. 10 2009 021 384

(51) Int. Cl.
*F04D 29/58*   (2006.01)
*F04D 29/54*   (2006.01)
*F01D 11/04*   (2006.01)
*F04D 29/10*   (2006.01)

(52) U.S. Cl.
CPC .............. *F04D 29/542* (2013.01); *F01D 11/04* (2013.01); *F04D 29/102* (2013.01); *F04D 29/584* (2013.01); *F05D 2260/205* (2013.01); *Y02T 50/671* (2013.01); *Y02T 50/676* (2013.01)

(58) Field of Classification Search
CPC ....... F01D 11/00; F01D 11/001; F01D 11/02; F01D 11/005; F01D 11/008; F01D 11/04; F01D 11/06
USPC ........... 415/115, 116, 168.2, 168.4, 176, 178, 415/180; 416/97 R, 96 R, 97 A, 96 A
See application file for complete search history.

(56) References Cited

U.S. PATENT DOCUMENTS

| 4,465,429 | A |   | 8/1984  | Martin et al.               |
|-----------|---|---|---------|-----------------------------|
| 4,820,116 | A | * | 4/1989  | Hovan et al. ......... 415/115 |
| 5,211,533 | A | * | 5/1993  | Walker et al. ......... 415/115 |
| 5,399,065 | A | * | 3/1995  | Kudo et al. ........... 415/115 |
| 5,685,158 | A | * | 11/1997 | Lenahan et al. ......... 60/726 |
| 6,267,553 | B1| * | 7/2001  | Burge .................. 415/115 |

(Continued)

FOREIGN PATENT DOCUMENTS

| DE | 1848451 | U | 3/1962  |
|----|---------|---|---------|
| DE | 1255113 | B | 11/1967 |

(Continued)

*Primary Examiner* — Ninh H Nguyen
*Assistant Examiner* — Justin Seabe
(74) *Attorney, Agent, or Firm* — Barlow, Josephs & Holmes, Ltd.

(57) ABSTRACT

A flow device having a cooling-air injection system for injecting cooling air into cavities (20, 24) between sealing elements (14a, 14b) or sealing bodies (16a, 16b), respectively, on the side of the guide vanes and on the side of the rotor is disclosed.

11 Claims, 3 Drawing Sheets

(56) References Cited

U.S. PATENT DOCUMENTS

| | | | |
|---|---|---|---|
| 6,398,488 B1 | 6/2002 | Solda et al. | |
| 6,832,891 B2 * | 12/2004 | Aschenbruck | F01D 11/025 415/115 |
| 7,101,144 B2 * | 9/2006 | Haje et al. | 415/115 |
| 2007/0253815 A1 | 11/2007 | Kopmels et al. | |
| 2008/0232949 A1 * | 9/2008 | Reichert et al. | 415/1 |
| 2009/0160135 A1 * | 6/2009 | Turini | F01D 11/02 277/418 |

FOREIGN PATENT DOCUMENTS

| | | |
|---|---|---|
| DE | 102005024696 A1 | 1/2006 |
| DE | 102006043610 A1 | 3/2008 |
| EP | 0735255 B1 | 6/2002 |
| EP | 1413711 A1 | 4/2004 |
| EP | 1219788 B1 | 2/2006 |
| EP | 1213444 B1 | 5/2007 |
| GB | 2270118 A | 7/1993 |

\* cited by examiner

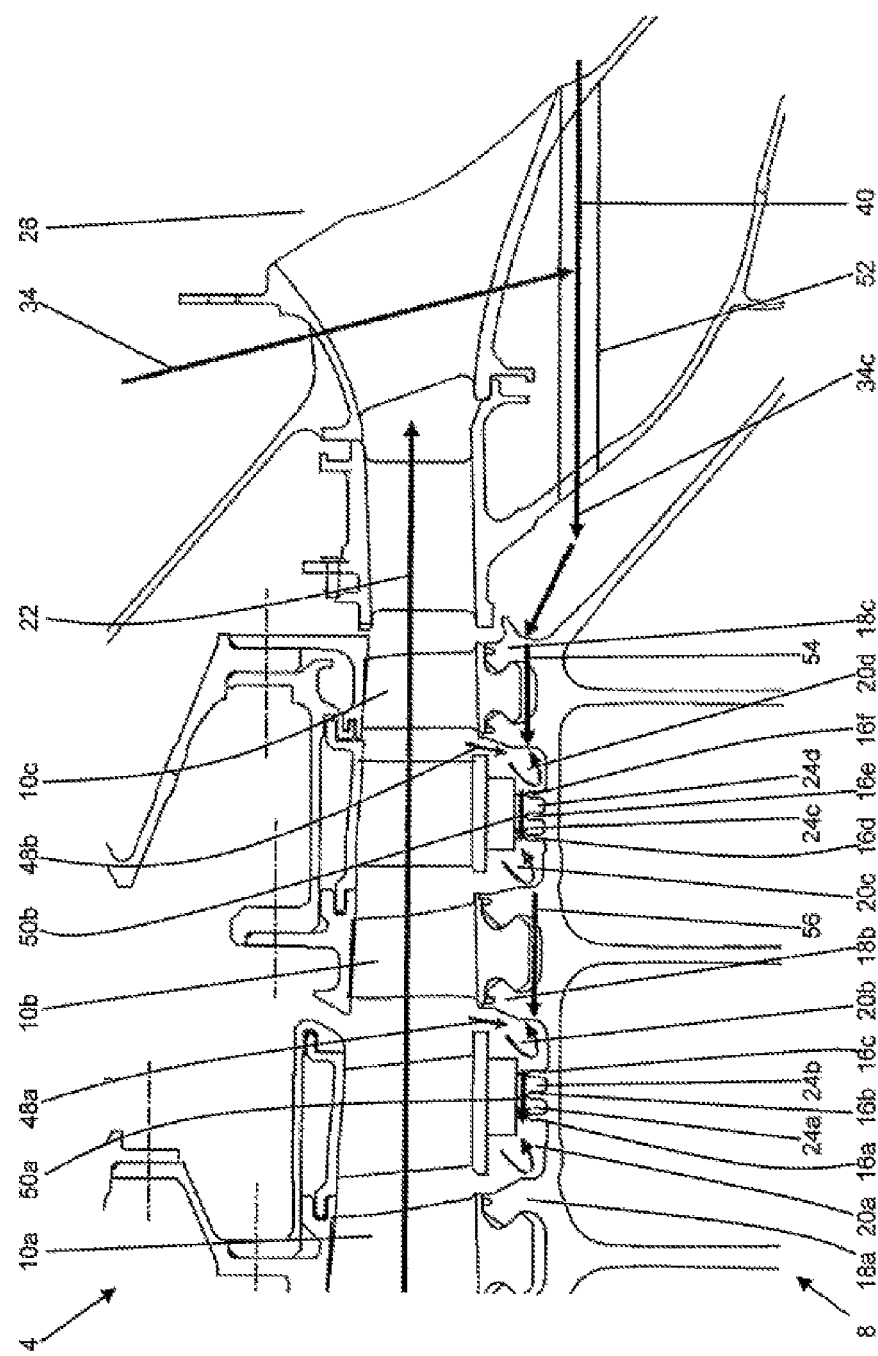

FLOW DEVICE COMPRISING A CAVITY COOLING SYSTEM

The invention relates to a flow device for gas turbines according to the preamble of claim 1.

Such a flow device designed as a compressor is shown, for example, in the German Patent Application DE 10 2005 045 255 A1 of the Applicant. This compressor for gas turbines is executed in an axial construction and has a multi-part housing, in which a rotor with a plurality of rotating vanes is mounted in a rotatable manner. Guide vanes that are attached to the housing extend between the rotating vanes. Plate-like sealing elements, which interact with opposite-lying radial collar-like sealing bodies of the rotor, are disposed on the guide vanes. The sealing elements and the sealing bodies form a plurality of axially adjacent cavities, so-called inner-air-seal cavities. Air, which flows into the cavities from a principal flow during operation of the compressor, is heated more intensely in the rear stages of the compressor than the air in the principal flow or main flow. This is based on the fact that the temperature distribution in the main flow is not constant, but rather increases toward its edge layers next to the wall. The air flows out from the hotter edge layers into the cavities, circulates therein and flows over the sealing body counter to the direction of the main flow. The air is further heated and again mixes with the air from the principal flow. This causes, however, an additional heating of the edge layers, so that the effect of the hotter edge layers is intensified. Because of this effect, the sealing elements, the sealing bodies and the recesses on the rotor side for fastening the rotating vanes are subjected to particularly high temperatures and are limited by temperature in their service life and strength.

The problem of the present invention is to create a flow device, which eliminates the above-named disadvantages and makes possible a targeted reduction of the temperature in the cavities.

The problem is solved by a flow device with the features of claim 1.

According to the invention, cooling air can be introduced into at least one of the cavities of the flow device, which is formed particularly as a compressor or turbine. The cooling air causes a reduction of the temperature in the at least one cavity and thus a temperature decrease in adjacent components. Its service life is increased without changing the geometry of the components. The geometry of the components can be optimized, whereby they can be designed lighter in weight.

In a preferred example of embodiment of the invention, the cooling air is injected radially into the cavity. For this purpose, a radial channel that extends radially between a housing channel of the flow device and the cavity is formed in at least one guide vane. The housing channel can open up into the outside environment and/or into a front stage of the compressor. In order to feed the cooling air from the outside environment and/or, for example, from the front stages of the compressor into the cavity, a pump can be provided in the housing channel. The radial channel in the guide vane has the advantage that it is cooled from the inside.

Likewise, the cooling air can be bled from a space in front of the combustion chamber. A diffuser channel that extends between the space in front of the combustion chamber and the radial channel is formed in a diffuser for this purpose. A heat exchanger is provided in the diffuser channel for cooling the air from the space in front of the combustion chamber. The diffuser channel has the advantage that the diffuser is cooled from the inside.

In another example of embodiment, the cooling air is injected axially into the cavity, counter to the main flow direction. In this case, the diffuser channel opens up into at least one axial channel, which is formed in a recess in the rotating vane and is opened to one of the cavities. In order to be able to feed the cooling air into several cavities, at least one connection channel that extends between the cavities to be cooled is formed in one of the rotating vane recesses. In addition to the cooling of the diffuser, this axial introduction of cooling air brings about a cooling of the rotating vane recess.

In order to be able to mix the air in the diffuser channel with the air from the outside environment, a through channel that opens up into the diffuser channel can be provided in the flow device. Because of this, the heat exchanger can be designed with reduced power.

In addition, a preliminary swirling mechanism can be provided in the diffuser channel for torsional loading of the air from the space in front of the combustion chamber.

In one example of embodiment, a positive-pressure cooling-air storage unit is provided for the withdrawal of the air.

Various advantageous embodiment examples are the subject of the additional subclaims.

Preferred embodiment examples of the invention will be explained in more detail in the following on the basis of schematic representations. Here:

FIG. 3 shows a detailed view with axial injection of cooling air.

FIG. 1 shows a longitudinal section through a high-pressure region of a flow device designed as a compressor 2, having a cooling-air injection system according to the invention. In this case, several types of cooling-air injection systems are shown in FIG. 1 and these may be operated individually or combined with one another.

Figure 1:
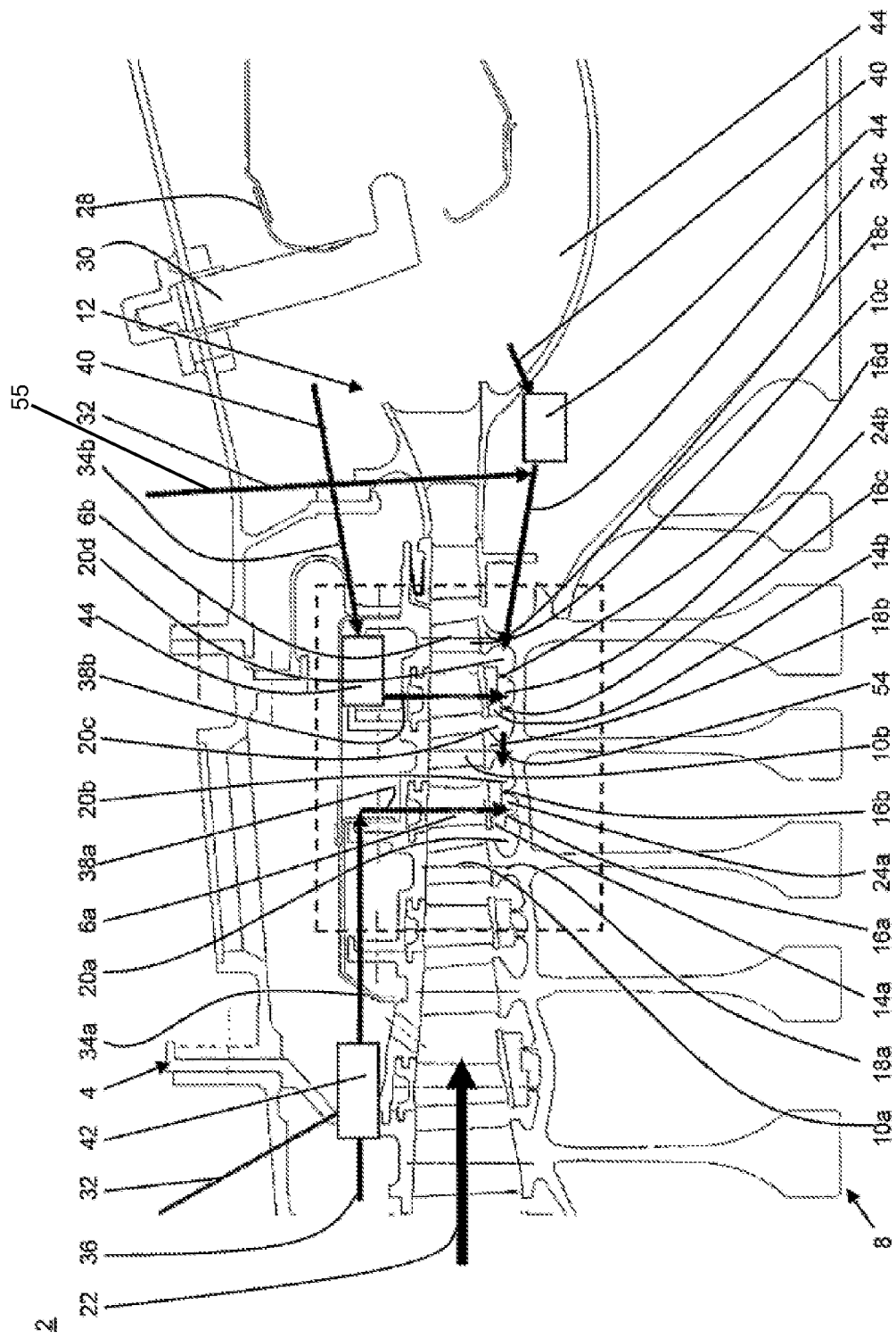
FIG. 1 shows a longitudinal section through a compressor with variants of a cooling air injection system according to the invention.

The compressor 2 is designed in axial construction and is part of a gas turbine, especially of an aircraft engine. It has a multi-part housing 4, which supports a plurality of guide vanes 6a, 6b, and in which a rotor 8 having a plurality of rotating vanes 10a, 10b, . . . is mounted in a rotatable manner. The guide vanes 6a, 6b and the rotating vanes 10a, 10b, . . . are disposed next to one another in an alternating manner in the axial direction of the compressor 2 and become smaller from an entrance (not shown) in the direction of a diffuser 12 on the turbine side.

At their tips, each of the guide vanes 6a, 6b bears a shroud, which, on its surface turned toward the rotor 8, is provided with a honeycombed and plate-like sealing element 14a, 14b.

On the rotor side, opposite the sealing elements 14a, 14b, are disposed radial collar-like or pin-type sealing bodies 16a, 16b, . . . , so-called sealing fins, which taper in the direction of sealing elements 14a, 14b. In the axial direction, they are disposed in pairs next to one another in rows and are distanced by their tips from the sealing elements 14a, 14b, each time via a radial gap, which is not given a reference numeral. Each of the sealing fins 16a, 16b, . . . forms with an adjacent guide vane recess 18a, 18b, . . . on the rotor side an annular space 20a, 20b, . . . , which is radially opened to the main flow 22. Ring-shaped intermediate spaces 24a, 24b, which interact via the respective radial gap with the adjacent annular spaces 20a, 20b, . . . , are formed between the sealing fins 16a, 16b, . . . . The annular spaces 20a, 20b, . . . and the intermediate spaces 24a, 24b are also designated as cavities 20, 24 in the following.

The main flow 22 is formed by air that flows through the entrance into the compressor 2 and exits from it in compressed form via the diffuser 12 into a space 26 in front of the combustion chamber on the turbine side. A plurality of burners 28 with torches 30 are connected downstream of the space 26 in front of the combustion chamber. A partial flow (not shown) is used for the cooling on the turbine side.

Cooling air is injected into the cavities 20, 24 according to the invention. One example of embodiment provides for environmental air 32 from the outside environment to be guided into the cavities 20, 24 as a flow of cooling air 34a.

Another example of embodiment provides for guiding air 36 that is bled from a preliminary compressor stage as a cooling-air flow 34a into the cavities 20, 24.

Another example of embodiment provides for guiding the environmental air 32 and the bled air 36 that are combined as cooling-air flow 34a into the cavities 20, 24.

Corresponding housing channels (not shown, but defined in the region of the arrow numbered 34a) are formed in the housing 4 for guiding the cooling-air flow 34a. These extend from the front compressor stage or from the outside environment in the direction of a radial channel (not shown) of the guide vane 6a. The cooling-air flow 34a through the radial channel is indicated by the arrow 38a. The radial channel extends radially through the guide vane 6a, including the shroud and the sealing element 14a, and opens up into the intermediate space 24a. In order to be able to inject the cooling-air flow 34a into the intermediate space 24a, an electrically operating pump 42 for increasing the pressure of the cooling-air flow 34a is provided in the housing channel.

One example of embodiment provides for guiding air 40 from the space in front of the combustion chamber into the cavities 20, 24 as a cooling-air flow 34b. The cooling-air flow 34b is guided through a diffuser channel (not shown) from the space 26 in front of the combustion chamber. An intermediate cooling unit in the form of a heat exchanger 44 is provided in the diffuser channel for cooling the cooling-air flow 34b. After cooling, the cooling-air flow 34b is guided through a radial channel (not shown) of the guide vane 6b into the intermediate space 24b. The guiding of cooling-air flow 34b through the radial channel is indicated by the arrow 38b.

Another example of embodiment provides for guiding the air 40 from the space in front of the combustion chamber on the rotor side as a cooling-air flow 34c through axial channels and connection channels (not shown) in the rotating-vane recesses 18b, 18c into the cavities 20, 24. The cooling-air flow 34c through the rotating-vane recesses 18b, 18c in the axial direction is indicated by the arrow 54.

Another example of embodiment provides for mixing the air 40 from the space in front of the combustion chamber, after passing through the heat exchanger 44, with environmental air 32 for the coolant flow 34c.

Figure 2:
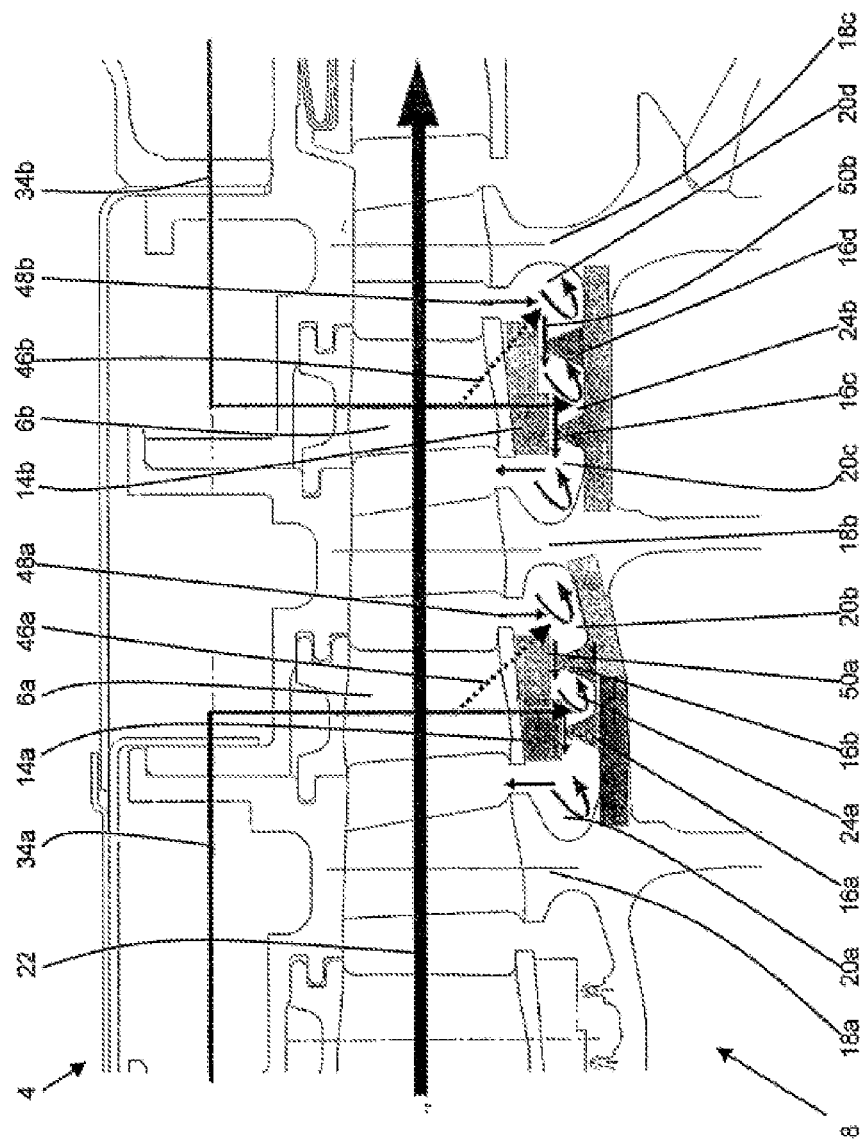
FIG. 2 shows a detailed view with radial injection of cooling air.

A detailed explanation of the injection of cooling air according to the invention follows from FIGS. 2 and 3.

FIG. 2 essentially shows a detailed representation of the region outlined by the dotted line in FIG. 1. The cooling-air flow 34a is introduced radially through the guide vane 6a into the intermediate space 24a. Parallel to this, the cooling-air flow 34b is introduced radially through the guide vane 6b into the intermediate space 24b. Additionally, a partial flow 46a, 46b of the cooling-air flows 34a, 34b in the guide vanes 6a, 6b is diverted into the respective rear annular space 20b, 20d.

During operation, air 48a, 48b flows out from the hotter edge layers of the main flow 22 into the annular spaces 20b, 20d. The air 48a, 48b is mixed there with the partial flows 46a, 46b and flows over the rear sealing fins 16b, 16d as the cooled counterflow 50a, 50b, counter to the direction of the main flow 22. The counterflows 50a, 50b enter into the respective intermediate space 24a, 24b and are swirled therein with the respective cooling-air flow 34a, 34b and again cooled. The counterflows 50a, 50b flow over the front sealing fins 16a, 16c in the direction of the annular spaces 20a, 20c, are again swirled in these spaces and finally are mixed with edge layers of the main flow 22, so that the latter are cooled.

Based on the injection of cooling air in the region of the cavities 20, 24 according to the invention, in particular, the sealing elements 14a, 14b and the sealing fins 16a, 16b, . . . are cooled and thus their strength is increased. With the same design of the components, the service life is increased, while with the same service life, the design can be optimized. Likewise, the stability of the guide vanes 6a, 6b is increased due to their inner cooling. In addition, the cooling has a positive effect on the rotating-vane recesses 18a, 18b, . . . .

FIG. 3 shows the example of embodiment mentioned in FIG. 1, in which a cooling-air flow 34c is bled from a space 26 in front of the combustion chamber and axially guided through rotating-vane recesses 18b, 18c on the rotor side counter to the direction of a main flow 22 into annular spaces 20b, 20d. This variant has the advantage that the rotating-vane recesses 18a, 18b, . . . and in particular the rotating vanes 10a, 10b, . . . are cooled on the foot side. In this case, two groups of three sealing fins 16a, 16b, . . . each are shown, and an intermediate space 24a, 24b, . . . is formed between each of these groups. In rotating-vane recess 18c, at least one axial channel (not shown, but defined in the region of the arrow numbered 54 in FIG. 3) is formed, which interacts with a diffuser channel 52 and is opened toward the intermediate space 24d. The direction of movement of the cooling-air flow 34c through the axial channel is indicated by the arrow 54. A connection channel (not shown, but defined in the region of the arrow numbered 56 in FIG. 3) is provided in the rotating-vane recess 18b, this channel extending between the annular spaces 20b, 20c, so that the cooling-air flow 34c can be guided from the annular space 20c into the annular space 20b. The direction of movement of the cooling-air flow 34c through the connection channel is indicated by the arrow 56. Additionally, a passage channel (shown for example as being defined in the region of the arrow numbered 55 in FIG. 1) for mixing the air 40 from the space in front of the combustion chamber with environmental air 32 opens up into the diffuser channel 52. The heat exchanger 44 shown in FIG. 1 is not shown here for reasons of clarity.

Through the axial channels in the rotating-vane recess 18c of the last rotating vane 10b, the cooling-air flow 34c enters into the annular space 20d, in which it is swirled with air 48b from hotter edge layers of the main flow 22. As a cooled counterflow 50b, the cooled air 48b flows over the sealing fins 16d, 16e, 16f and is swirled again in the annular space 20c. The swirled counterflow 50b enters into the annular space 20b through the connection channel and is swirled therein with air 48a from the hotter edge layers of the main flow 22. As counterflow 50a, it flows over the sealing fins 16a, 16b, 16c, is swirled in the annular space 20a and leaves the annular space 20a in the direction of the main flow 22, where it is mixed with the edge layers. The further guidance axially of the cooling-air flow 34c through the rotating-vane recesses 18a, 18b, . . . can be repeated until the counterflow 50a, 50b has heated up, as long as no further cooling of the air 48a, 48b diverted from the main flow 22 has been produced.

Although a swirling of the counterflows 50a, 50b in the intermediate spaces 24a, 24b, . . . has not been expressly named in the above description for FIG. 3, this does occur, however, as was described above for FIG. 2.

In one example of embodiment (not shown), a preliminary swirling mechanism in the form of preliminary swirling nozzles is provided in the diffuser channel 52 for the torsional loading of the cooling-air flow 34c.

The pump 42 mentioned relative to FIGS. 1 and 2 can also be mechanically driven via a device support.

In another example of embodiment (not shown), the air for the cooling-air flow 34a, 34b, . . . is removed from a positive-pressure cooling-air storage unit and injected into the cavities 20, 24 radially via radial channels in the guide vanes 6a, 6b or axially via axial channels and connection channels in the rotating-vane recesses 18a, 18b, . . . .

A flow device having a cooling-air injection system for injecting cooling air into cavities 20, 24 between sealing elements 14a, 14b and sealing bodies 16a, 16b, . . . , respectively, on the side of the guide vanes and on the side of the rotor is disclosed.

The invention claimed is:

1. A compressor in axial construction for a gas turbine, the compressor having a housing that bears a plurality of guide vanes, and in which a rotor with a plurality of rotating vanes can be mounted in a rotatable manner, the guide vanes having sealing elements with opposite-lying sealing bodies on the rotor side, is hereby characterized in that:

at least one radial channel is formed in at least one guide vane that extends radially between a housing channel and a cavity; and the sealing bodies further comprise a first sealing fin and a second sealing fin;

the cavity further comprises an intermediate space delimited by the first sealing fin, the second sealing fin, and the sealing elements;

the cavity further comprises a first annular space and a second annular space, the first annular space being downstream of said respective sealing fins during operation of the compressor, and the second annular space being upstream of said respective sealing fins during operation of the compressor;

the at least one radial channel being configured and arranged to guide a cooling-air flow that is injected radially inwardly, the at least one radial channel being configured to simultaneously guide a first portion of the cooling-air flow into the intermediate space and a second portion of the cooling-air flow into the first annular space, whereby the cooling-air flow is introduced into the intermediate space and the first annular space during operation of the compressor;

the first and second sealing fins and the sealing elements being configured to provide a counterflow of the cooling-air from the first annular space to the intermediate space and from the intermediate space to the second annular space during operation of the compressor.

2. The compressor according to claim 1, wherein the housing channel opens up into the outside environment for introducing environmental air.

3. The compressor according to claim 1, wherein the housing channel opens up into a front compressor stage for introducing bled air.

4. The compressor according to claim 1, wherein a pump is provided for feeding the cooling-air flow into the cavity.

5. The compressor according to claim 1, wherein the housing channel interacts with a diffuser channel for introducing air from in front of a combustion chamber from a space in front of the combustion chamber.

6. The compressor according to claim 1, wherein the cooling-air flow can be introduced axially counter to the direction of a main flow.

7. The compressor according to claim 6, wherein at least one rotating-vane recess on the rotor side is penetrated by an axial channel that is opened at least to one of the annular spaces.

8. The compressor according to claim 7, wherein the axial channel interacts with the diffuser channel for introducing air from a space in front of a combustion chamber.

9. The compressor according to claim 7, wherein the annular spaces interact with one another via at least one connection channel in an adjacent rotating-vane recess.

10. The compressor according to claim 5, wherein at least one passage channel opens up into the diffuser channel for introducing environmental air.

11. The compressor according to claim 5, wherein a heat exchanger is disposed in the diffuser channel for the intermediate cooling of the air from the space in front of the combustion chamber.

* * * * *